United States Patent
Boyd et al.

(10) Patent No.: US 7,474,623 B2
(45) Date of Patent: Jan. 6, 2009

(54) METHOD OF ROUTING I/O ADAPTER ERROR MESSAGES IN A MULTI-HOST ENVIRONMENT

(75) Inventors: William T. Boyd, Poughkeepsie, NY (US); Douglas M. Freimuth, New York, NY (US); William G. Holland, Cary, NC (US); Steven W. Hunter, Raleigh, NC (US); Renato J. Recio, Austin, TX (US); Steven M. Thurber, Austin, TX (US); Madeline Vega, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 598 days.

(21) Appl. No.: 11/260,619

(22) Filed: Oct. 27, 2005

(65) Prior Publication Data
US 2007/0097871 A1 May 3, 2007

(51) Int. Cl.
*H04B 7/212* (2006.01)
(52) U.S. Cl. .................... 370/242; 714/48; 714/57
(58) Field of Classification Search ......... 370/242–245, 370/252; 714/47–57
See application file for complete search history.

(56) References Cited

U.S. PATENT DOCUMENTS

| | | | |
|---|---|---|---|
| 5,257,353 A | 10/1993 | Blanck et al. | |
| 5,367,695 A | 11/1994 | Narad et al. | |
| 5,392,328 A | 2/1995 | Schmidt et al. | |
| 5,640,504 A * | 6/1997 | Johnson, Jr. .................... | 714/4 |
| 5,758,053 A * | 5/1998 | Takeuchi et al. ................ | 714/4 |
| 5,960,213 A | 9/1999 | Wilson | |

(Continued)

FOREIGN PATENT DOCUMENTS

WO 2006089914 A1 8/2006

OTHER PUBLICATIONS

U.S. Appl. No. 11/348,903, filed Feb. 7, 2006, Boyd et al.

(Continued)

*Primary Examiner*—Chi H. Pham
*Assistant Examiner*—Phuc Tran
(74) *Attorney, Agent, or Firm*—Duke W. Yee; Matthew W. Baca; James O. Skarsten

(57) ABSTRACT

A method and apparatus is provided for routing error messages in a distributed computer system comprising multiple root nodes, and further comprising one or more PCI switches and one or more I/O adapters, wherein each root node includes one or more system images. In one useful embodiment, a method is provided for routing I/O error messages to root nodes respectively associated with the errors contained in the messages. The method includes detecting occurrence of an error at a specified one of the adapters, wherein the error affects one of the system images, and generating an error message at the specified adapter. The method further comprises routing the error message from the specified adapter to the particular root node that includes the affected system image. The error message is then selectively processed at the particular root node, in order to identify the affected system image. Usefully, the step of routing the error message includes using a bus/device/function number associated with the error, together with a routing table located in one of the PCI switches, to route the error message to the correct root node and system image.

1 Claim, 5 Drawing Sheets

U.S. PATENT DOCUMENTS

| | | | |
|---|---|---|---|
| 5,968,189 A * | 10/1999 | Desnoyers et al. | 714/47 |
| 6,061,753 A | 5/2000 | Ericson | |
| 6,662,251 B2 | 12/2003 | Brock et al. | |
| 6,769,021 B1 | 7/2004 | Bradley et al. | |
| 6,775,750 B2 | 8/2004 | Krueger | |
| 6,907,510 B2 | 6/2005 | Bennett et al. | |
| 7,036,122 B2 | 4/2006 | Bennett et al. | |
| 7,096,305 B2 | 8/2006 | Moll | |
| 7,134,052 B2 | 11/2006 | Bailey et al. | |
| 7,174,413 B2 | 2/2007 | Pettey et al. | |
| 7,188,209 B2 | 3/2007 | Pettey et al. | |
| 7,194,538 B1 | 3/2007 | Rabe et al. | |
| 2002/0188701 A1 | 12/2002 | Brown et al. | |
| 2003/0221030 A1 | 11/2003 | Pontius et al. | |
| 2004/0039986 A1 | 2/2004 | Solomon et al. | |
| 2004/0123014 A1 | 6/2004 | Schaefer et al. | |
| 2004/0172494 A1 | 9/2004 | Pettey et al. | |
| 2004/0210754 A1 | 10/2004 | Barron et al. | |
| 2004/0230709 A1 | 11/2004 | Moll | |
| 2004/0230735 A1 | 11/2004 | Moll | |
| 2005/0025119 A1 | 2/2005 | Pettey et al. | |
| 2005/0028216 A1* | 2/2005 | Vogel et al. | 725/107 |
| 2005/0044301 A1 | 2/2005 | Vasilevsky et al. | |
| 2005/0102682 A1 | 5/2005 | Shah et al. | |
| 2005/0147117 A1 | 7/2005 | Pettey et al. | |
| 2005/0188116 A1 | 8/2005 | Brown et al. | |
| 2005/0228531 A1 | 10/2005 | Genovker et al. | |
| 2005/0270988 A1 | 12/2005 | DeHaemer | |
| 2006/0168361 A1 | 7/2006 | Brown et al. | |
| 2006/0179195 A1 | 8/2006 | Sharma et al. | |
| 2006/0184711 A1 | 8/2006 | Pettey et al. | |
| 2006/0195617 A1 | 8/2006 | Arndt et al. | |
| 2006/0206655 A1 | 9/2006 | Chappell et al. | |
| 2006/0206936 A1 | 9/2006 | Liang et al. | |
| 2006/0212608 A1 | 9/2006 | Arndt et al. | |
| 2006/0212620 A1 | 9/2006 | Arndt et al. | |
| 2006/0212870 A1 | 9/2006 | Arndt et al. | |
| 2006/0230181 A1 | 10/2006 | Riley | |
| 2006/0230217 A1 | 10/2006 | Moll | |
| 2006/0242333 A1 | 10/2006 | Johnsen et al. | |
| 2006/0242352 A1 | 10/2006 | Torudbakken et al. | |
| 2006/0242354 A1 | 10/2006 | Johnsen et al. | |
| 2006/0253619 A1 | 11/2006 | Torudbakken et al. | |
| 2006/0271718 A1* | 11/2006 | DiPlacido et al. | 710/263 |
| 2007/0019637 A1 | 1/2007 | Boyd et al. | |
| 2007/0027952 A1 | 2/2007 | Boyd et al. | |
| 2007/0097948 A1 | 5/2007 | Boyd et al. | |
| 2007/0097949 A1 | 5/2007 | Boyd et al. | |
| 2007/0097950 A1 | 5/2007 | Boyd et al. | |
| 2007/0101016 A1 | 5/2007 | Boyd et al. | |
| 2007/0136458 A1 | 6/2007 | Boyd et al. | |

OTHER PUBLICATIONS

U.S. Appl. No. 11/334,678, filed Jan. 18, 2006, Boyd et al.
U.S. Appl. No. 11/340,447, filed Jan. 26, 2006, Boyd et al.
U.S. Appl. No. 11/351,020, filed Feb. 9, 2006, Boyd et al.
U.S. Appl. No. 11/567,411, filed Dec. 6, 2006, Boyd et al.
U.S. Appl. No. 11/567,425, filed Dec. 6, 2006, Boyd et al.
U.S. Appl. No. 11/066,424, filed Feb. 25, 2005, Arndt et al.
U.S. Appl. No. 11/066,645, filed Feb. 25, 2005, Arndt et al.
U.S. Appl. No. 11/065,869, filed Feb. 25, 2005, Arndt et al.
U.S. Appl. No. 11/065,951, filed Feb. 25, 2005, Arndt et al.
U.S. Appl. No. 11/066,201, filed Feb. 25, 2005, Arndt et al.
U.S. Appl. No. 11/065,818, filed Feb. 25, 2005, Arndt et al.
U.S. Appl. No. 11/066,518, filed Feb. 25, 2005, Arndt et al.
U.S. Appl. No. 11/066,096, filed Feb. 25, 2005, Arndt et al.
U.S. Appl. No. 11/065,823, filed Feb. 25, 2005, Arndt et al.
U.S. Appl. No. 11/054,274, filed Feb. 9, 2005, Flood et al.
U.S. Appl. No. 11/055,850, filed Feb. 11, 2005, Bishop et al.
U.S. Appl. No. 11/054,889, filed Feb. 10, 2005, Frey et al.
U.S. Appl. No. 11/054,871, filed Feb. 10, 2005, Griswell et al.
U.S. Appl. No. 11/055,831, filed Feb. 11, 2005, Bishop et al.
U.S. Appl. No. 11/056,691, filed Feb. 11, 2005, Le et al.
U.S. Appl. No. 11/056,878, filed Feb. 12, 2005, Bishop et al.
U.S. Appl. No. 11/056,692, filed Feb. 11, 2005, Floyd et al.
U.S. Appl. No. 11/049,342, filed Feb. 25, 2005, Lloyd et al.
U.S. Appl. No. 11/053,529, filed Feb. 8, 2005, Flood et al.
U.S. Appl. No. 11/140,648, filed May. 27, 2005, Mack et al.

* cited by examiner

ERROR MESSAGE REQUEST PACKET

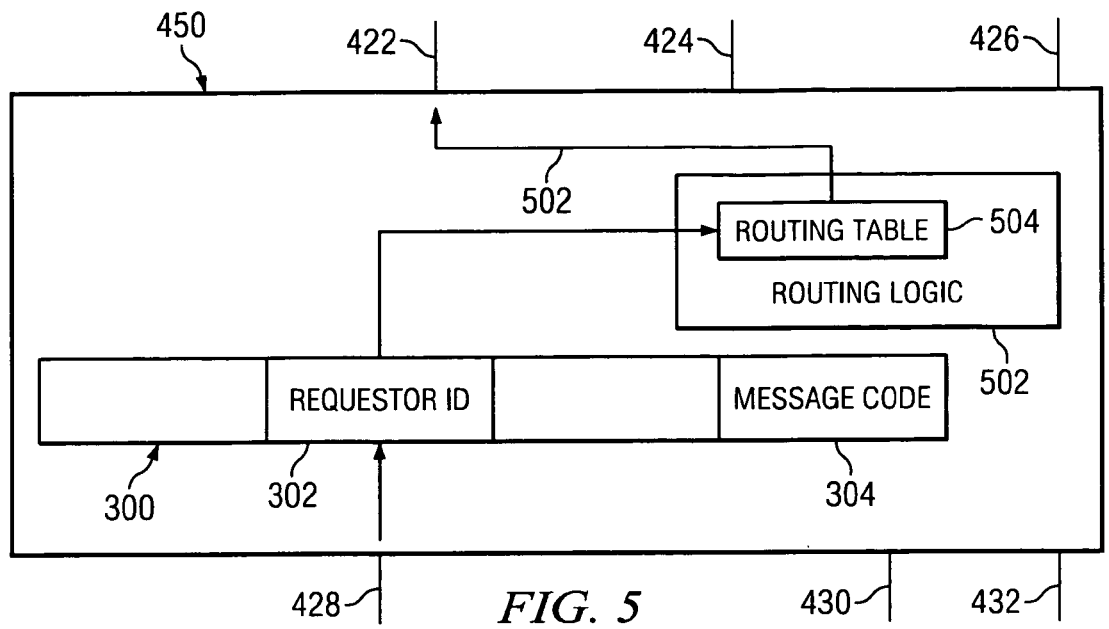

FIG. 5

MESSAGE REQUEST
MAPPING TABLE
600

| | | | | |
|---|---|---|---|---|
| PORT$_1$ | REQUESTOR ID VALUE | 602 | MESSAGE CODE VALUE | 618 |
| PORT$_2$ | REQUESTOR ID VALUE | 604 | MESSAGE CODE VALUE | 620 |
| PORT$_3$ | REQUESTOR ID VALUE | 606 | MESSAGE CODE VALUE | 622 |
| PORT$_4$ | REQUESTOR ID VALUE | 608 | MESSAGE CODE VALUE | 624 |
| PORT$_5$ | REQUESTOR ID VALUE | 610 | MESSAGE CODE VALUE | 626 |
| PORT$_6$ | REQUESTOR ID VALUE | 612 | MESSAGE CODE VALUE | 628 |
| PORT... | REQUESTOR ID VALUE | 614 | MESSAGE CODE VALUE | 630 |
| PORT$_N$ | REQUESTOR ID VALUE | 616 | MESSAGE CODE VALUE | 632 |

FIG. 6

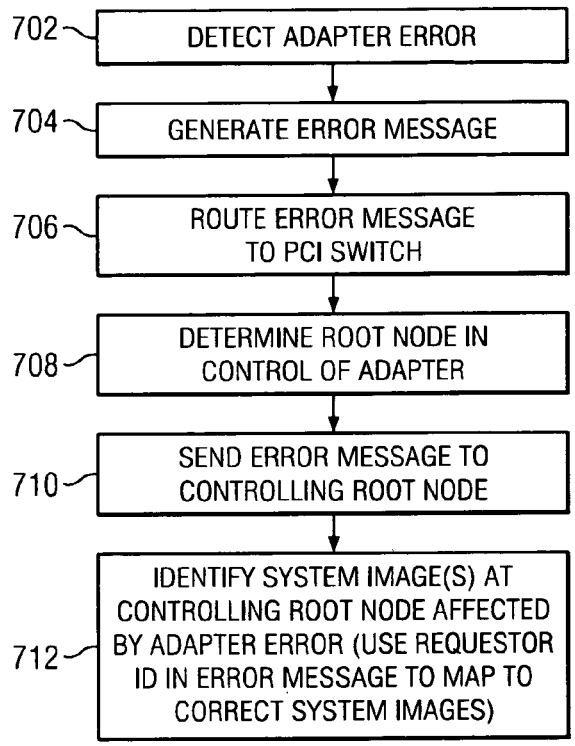

FIG. 7

| | | | |
|---|---|---|---|
| $SI_1$ | BDF NUMBER ⟋802 | ERROR MESSAGE CODE NUMBER | ⟋818 |
| $SI_2$ | BDF NUMBER ⟋804 | ERROR MESSAGE CODE NUMBER | ⟋820 |
| $SI_3$ | BDF NUMBER ⟋806 | ERROR MESSAGE CODE NUMBER | ⟋822 |
| $SI_4$ | BDF NUMBER ⟋808 | ERROR MESSAGE CODE NUMBER | ⟋824 |
| $SI_5$ | BDF NUMBER ⟍810 | ERROR MESSAGE CODE NUMBER | ⟍826 |
| $SI_6$ | BDF NUMBER ⟍812 | ERROR MESSAGE CODE NUMBER | ⟍828 |
| SI... | BDF NUMBER ⟍814 | ERROR MESSAGE CODE NUMBER | ⟍830 |
| $SI_N$ | BDF NUMBER ⟍816 | ERROR MESSAGE CODE NUMBER | ⟍832 |

MAPPING TABLE IN ROOT COMPLEX 800

FIG. 8

METHOD OF ROUTING I/O ADAPTER ERROR MESSAGES IN A MULTI-HOST ENVIRONMENT

BACKGROUND OF THE INVENTION

1. Field of the Invention

The invention disclosed and claimed herein generally pertains to a method and related apparatus for routing PCI transaction packets between multiple root nodes and adapters, through a PCI switched-fabric bus. More particularly, the invention pertains to a method of the above type wherein packets from different system images of the root nodes may be routed through the fabric to share the same adapter. Even more particularly, the invention pertains to a method of the above type wherein it is necessary to provide an arrangement for routing an error notification message from an adapter to a system image affected by the error.

2. Description of the Related Art

As is well known by those of skill in the art, PCI Express (PCI-E) is widely used in computer systems to interconnect host units to adapters or other components, by means of a PCI switched-fabric bus or the like. However, PCI-E currently does not permit the sharing of input/output (I/O) adapters in topologies where there are multiple hosts with multiple shared PCI buses. As a result, even though such sharing capability could be very valuable when using blade clusters or other clustered servers, adapters for PCI-E and secondary networks (e.g., FC, IB, Enet) are at present generally placed only into individual blades and server systems. Thus, such adapters cannot be shared between clustered blades, or even between multiple roots within a clustered system.

In an environment containing multiple blades or blade clusters, it can be very costly to dedicate a PCI adapter for use with only a single blade. For example, a 10 Gigabit Ethernet (10 GigE) adapter currently costs on the order of $6,000. The inability to share these expensive adapters between blades has, in fact, contributed to the slow adoption rate of certain new network technologies such as 10 GigE. Moreover, there is a constraint imposed by the limited space available in blades to accommodate I/O adapters. This problem of limited space could be overcome if a PC network was able to support attachment of multiple hosts to a single PCI adapter, so that virtual PCI I/O adapters could be shared between the multiple hosts.

In a multi-host system of the above type, respective hosts may be grouped in host CPU sets or root nodes, wherein each host in a root node corresponds to a system image therein. Error message packets, which provide notice of errors occurring in the shared I/O adapters, must be handled with special requirements. More particularly, such error messages need to be routed to the root node to which the I/O adapter, or shared virtual I/O adapter, is assigned and by which the adapter is controlled. Moreover, it is necessary to notify the system images in the respective root nodes that errors have occurred which may affect them. In general, I/O adapter errors in a multi-root node environment can freeze the operations of systems using those adapters. Accordingly, it would be beneficial to provide an effective mechanism for accurately routing shared I/O adapter error messages to the correct root nodes and system images. This would serve to make operations in a multi-host environment much more reliable.

SUMMARY OF THE INVENTION

The invention is generally directed to a distributed computer system comprising multiple root nodes, and further comprising one or more PCI switches and one or more I/O adapters, wherein each root node includes one or more system images. In one useful embodiment, a method is provided for routing I/O error messages to a corresponding root node. The method includes the steps of detecting occurrence of an error at a specified one of the adapters, wherein the error affects one of the system images, and generating an error message at the specified adapter. The method further comprises routing the error message from the specified adapter to the particular root node that includes the affected system image. The error message is then selectively processed at the particular root node, in order to identify the affected system image. Usefully, the step of routing the error message includes using a bus/device/function number associated with the error, together with a routing table located in one of the PCI switches, to route the error message to the correct root node and system image.

BRIEF DESCRIPTION OF THE DRAWINGS

FIG. 5 is a block diagram showing components of the PCI switch of FIG. 4 in further detail.

FIG. 6 is a schematic diagram for a look-up table for use in the switch of FIG. 4.

FIG. 7 is a flow chart illustrating a procedure associated with an embodiment of the invention.

FIG. 8 is a schematic diagram for a look-up table for use in identifying a system image or host partition affected by an error.

DETAILED DESCRIPTION OF THE PREFERRED EMBODIMENT

Figure 1:
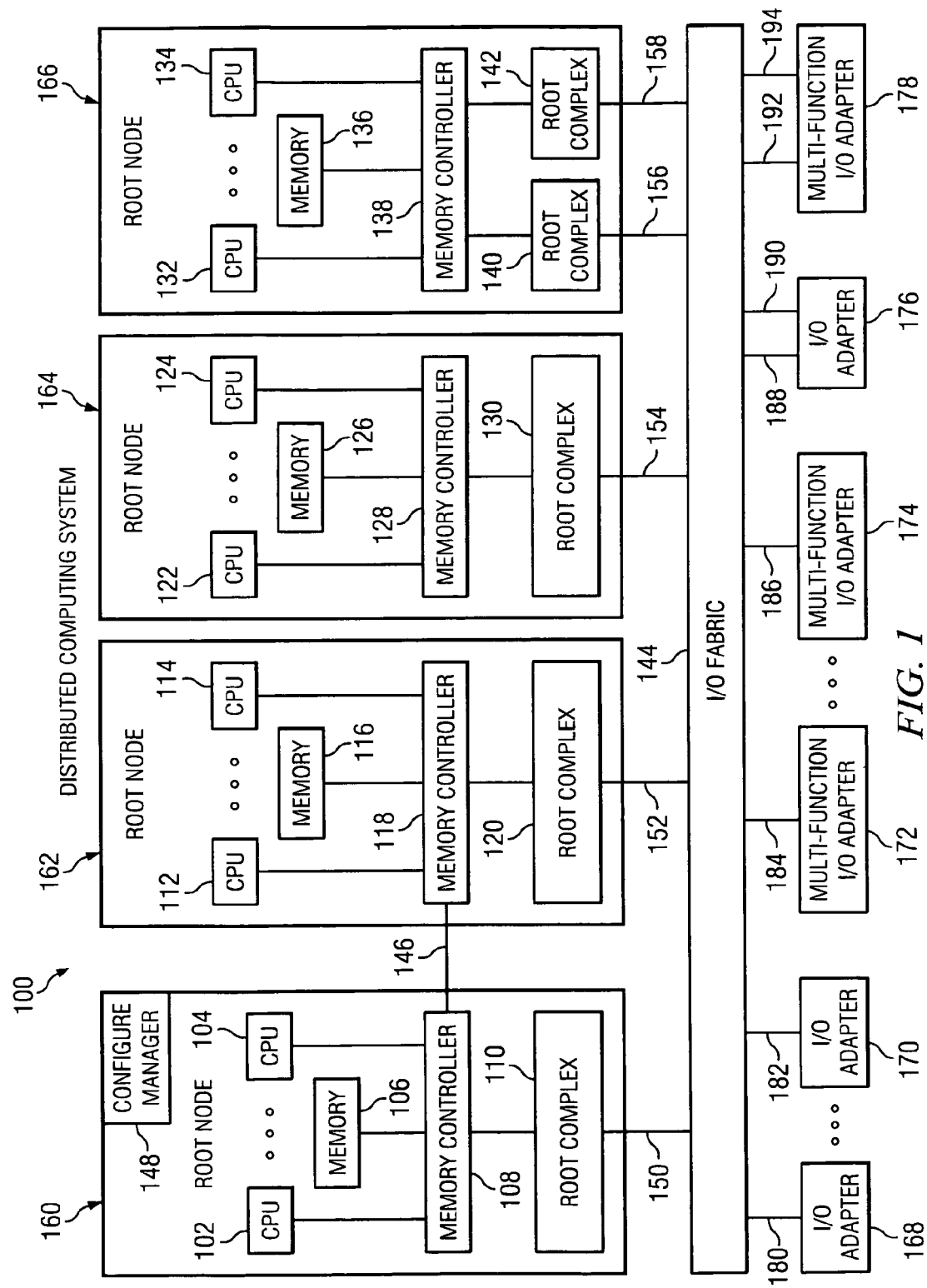
FIG. 1 is a block diagram showing a generic distributed computer system in which an embodiment of the invention can be implemented.

FIG. 1 shows a distributed computer system 100 comprising a preferred embodiment of the present invention. The distributed computer system 100 in FIG. 1 takes the form of multiple root complexes (RCs) 110, 120, 130, 140 and 142, respectively connected to an I/O switched-fabric bus 144 through I/O links 150, 152, 154, 156 and 158, and to the memory controllers 108, 118, 128 and 138 of the root nodes (RNs) 160-166. The I/O fabric is attached to I/O adapters (IOAs) 168-178 through links 180-194. The IOAs may be single function, such as IOAs 168-170 and 176, or multiple function, such as IOAs 172-174 and 178. Moreover, respective IOAs may be connected to the I/O fabric 144 via single links, such as links 180-186, or with multiple links for redundancy, such as links 188-194.

The RCs 110, 120, and 130 are integral components of RN 160, 162 and 164, respectively. There may be more than one RC in an RN, such as RCs 140 and 142 which are both integral components of RN 166. In addition to the RCs, each RN consists of one or more Central Processing Units (CPUs) 102-104, 112-114, 122-124 and 132-134, memories 106, 116, 126 and 136, and memory controllers 108, 118, 128 and 138. The memory controllers respectively interconnect the CPUs, memory, and I/O RCs of their corresponding RNs, and perform such functions as handling the coherency traffic for respective memories.

RN's may be connected together at their memory controllers, such as by a link 146 extending between memory controllers 108 and 118 of RNs 160 and 162. This forms one coherency domain which may act as a single Symmetric Multi-Processing (SMP) system. Alternatively, nodes may be independent from one another with separate coherency domains as in RNs 164 and 166.

FIG. 1 shows a PCI Configuration Manager (PCM) 148 incorporated into one of the RNs, such as RN 160, as an integral component thereof. The PCM configures the shared resources of the I/O fabric and assigns resources to the RNs.

Distributed computing system 100 may be implemented using various commercially available computer systems. For example, distributed computing system 100 may be implemented using an IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
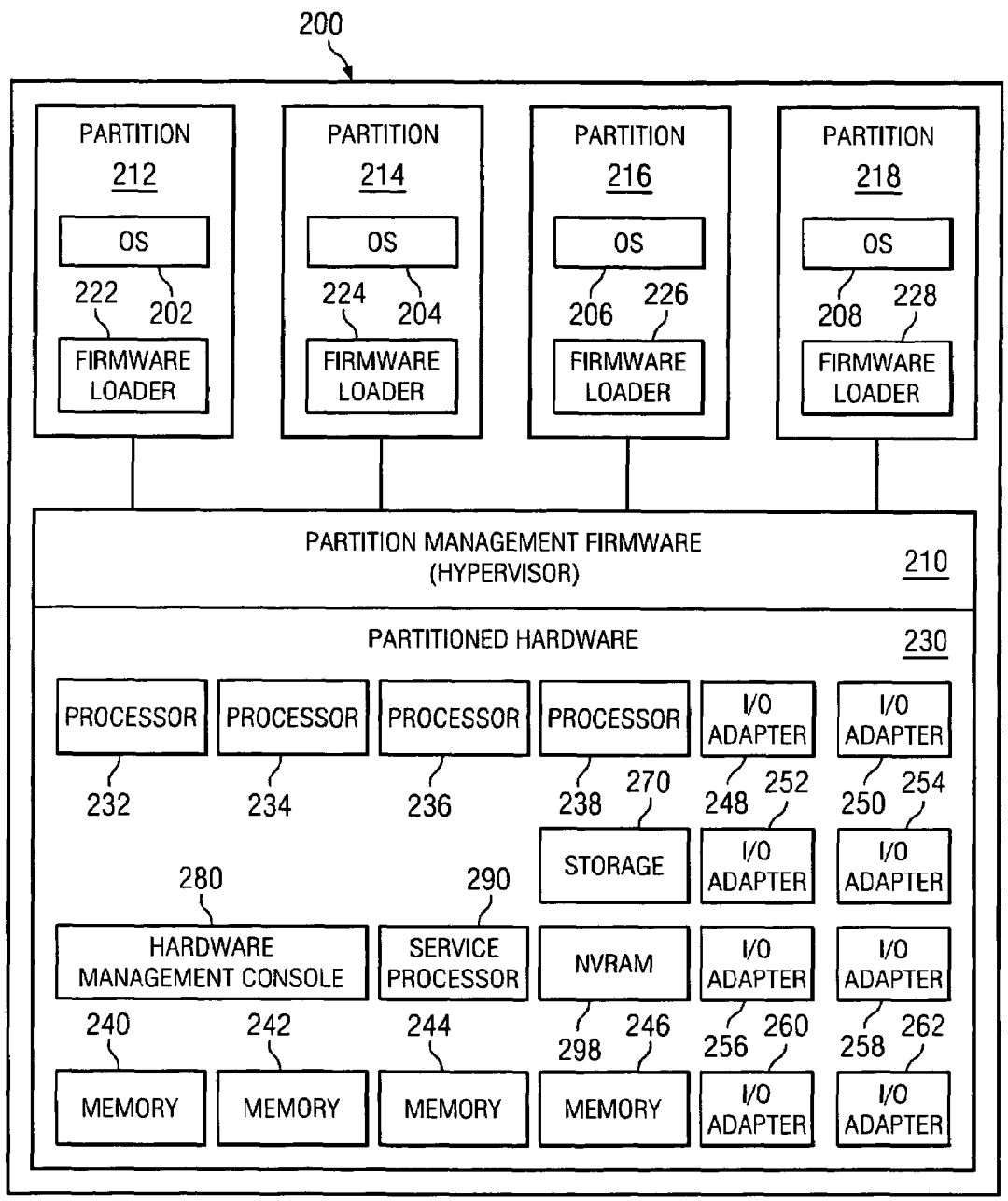
FIG. 2 is a block diagram showing an exemplary logical partition platform associated with the system of FIG. 1.

With reference to FIG. 2, a block diagram of an exemplary logical partitioned platform 200 is depicted in which the present invention may be implemented. The hardware in logically partitioned platform 200 may be implemented as, for example, distributed computer system 100 in FIG. 1. Logically partitioned platform 200 includes partitioned hardware 230, operating systems 202, 204, 206, 208 and hypervisor 210. Operating systems 202, 204, 206 and 208 may be multiple copies of a single operating system, or may be multiple heterogeneous operating systems simultaneously run on platform 200. These operating systems may be implemented using OS/400, which is designed to interface with a hypervisor. Operating systems 202, 204, 206 and 208 are located in partitions 212, 214, 216 and 218, respectively. Additionally, these partitions respectively include firmware loaders 222, 224, 226 and 228. When partitions 212, 214, 216 and 218 are instantiated, a copy of open firmware is loaded into each partition by the hypervisor's partition manager. The processors associated or assigned to the partitions are then dispatched to the partitions' memory to execute the partition firmware.

Partitioned hardware 230 includes a plurality of processors 232-238, a plurality of system memory units 240-246, a plurality of input/output (I/O) adapters 248-262, and a storage unit 270. Partition hardware 230 also includes service processor 290, which may be used to provide various services, such as processing of errors in the partitions. Each of the processors 232-238, memory units 240-246, NVRAM 298, and I/O adapters 248-262 may be assigned to one of multiple partitions within logically partitioned platform 200, each of which corresponds to one of the operating systems 202, 204, 206 and 208.

Partition management firmware (hypervisor) 210 performs a number of functions and services for partitions 212, 214, 216 and 218 to create and enforce the partitioning of logically partitioned platform 200. Hypervisor 210 is a firmware implemented virtual machine identical to the underlying hardware. Hypervisor software is available from International Business Machines Corporation. Firmware is "software" stored in a memory chip that holds its content without electrical power, such as, for example, read-only memory (ROM), programmable ROM (PROM), electrically erasable programmable ROM (EEPROM), and non-volatile random access memory (NVRAM). Thus, hypervisor 210 allows the simultaneous execution of independent OS images 202, 204, 206 and 208 by virtualizing all the hardware resources of logically partitioned platform 200.

Operation of the different partitions may be controlled through a hardware management console, such as hardware management console 280. Hardware management console 280 is a separate distributed computing system from which a system administrator may perform various functions including reallocation of resources to different partitions.

In an environment of the type shown in FIG. 2, it is not permissible for resources or programs in one partition to affect operations in another partition. Moreover, to be useful, the assignment of resources needs to be fine-grained. For example, it is often not acceptable to assign all IOAs under a particular PCI host bridge (PHB) to the same partition, as that will restrict configurability of the system, including the ability to dynamically move resources between partitions.

The invention is generally concerned with the occurrence of errors in a distributed computer system of the type described above, and more particularly with errors occurring in or in association with the I/O adapters of such system. The invention provides a mechanism that (1) detects such errors and generates corresponding error messages; (2) routes each error message through the I/O switched-fabric to the correct root node, i.e., the root node containing a system image that is then in control of the adapter; and (3) using a filter in the root node to identify the controlling system image.

Figure 3:
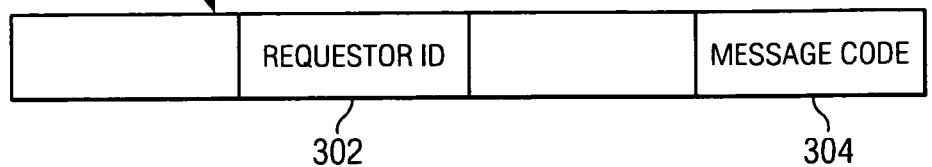
FIG. 3 is a schematic diagram illustrating components of an error message packet useful for routing an error message in accordance with an embodiment of the invention.

Referring to FIG. 3, there is shown an error message packet 300, also referred to as an error message request packet, that is generated when an error of the above type occurs. (In a PCI fabric, a requester is the source of a transaction and is identified by a bus/device/function number.) The components affected by an error determine what detects the error, and also what generates an error request message. Thus, if the entire adapter is affected, which could affect multiple virtual adapters, the error could be detected by the adapter under normal bus detection, like PCI, or by the switch above the adapter. If a subset of the adapter is affected, such as just one bus, device, function in PCI, the error is most likely a problem within the adapter, so that the adapter would detect and generate the error message. If a sub-function of the adapter, such as a virtual adapter or a sub-function of the bus, device, function is affected by the error, the error is detected by the adapter and should be reported thereby.

Referring further to FIG. 3, there is shown error message packet 300 provided with a requester identification field 302 and a message code 304. Message code 304 generally represents an error or type of error that has been identified by an entity represented by requestor ID 302. Requestor ID 302 provides an indication of the detector of the error, but not necessarily the entities that might be affected by the error. The requestor ID 302 could be a bus, device, function number in the preferred embodiment.

Figure 4:
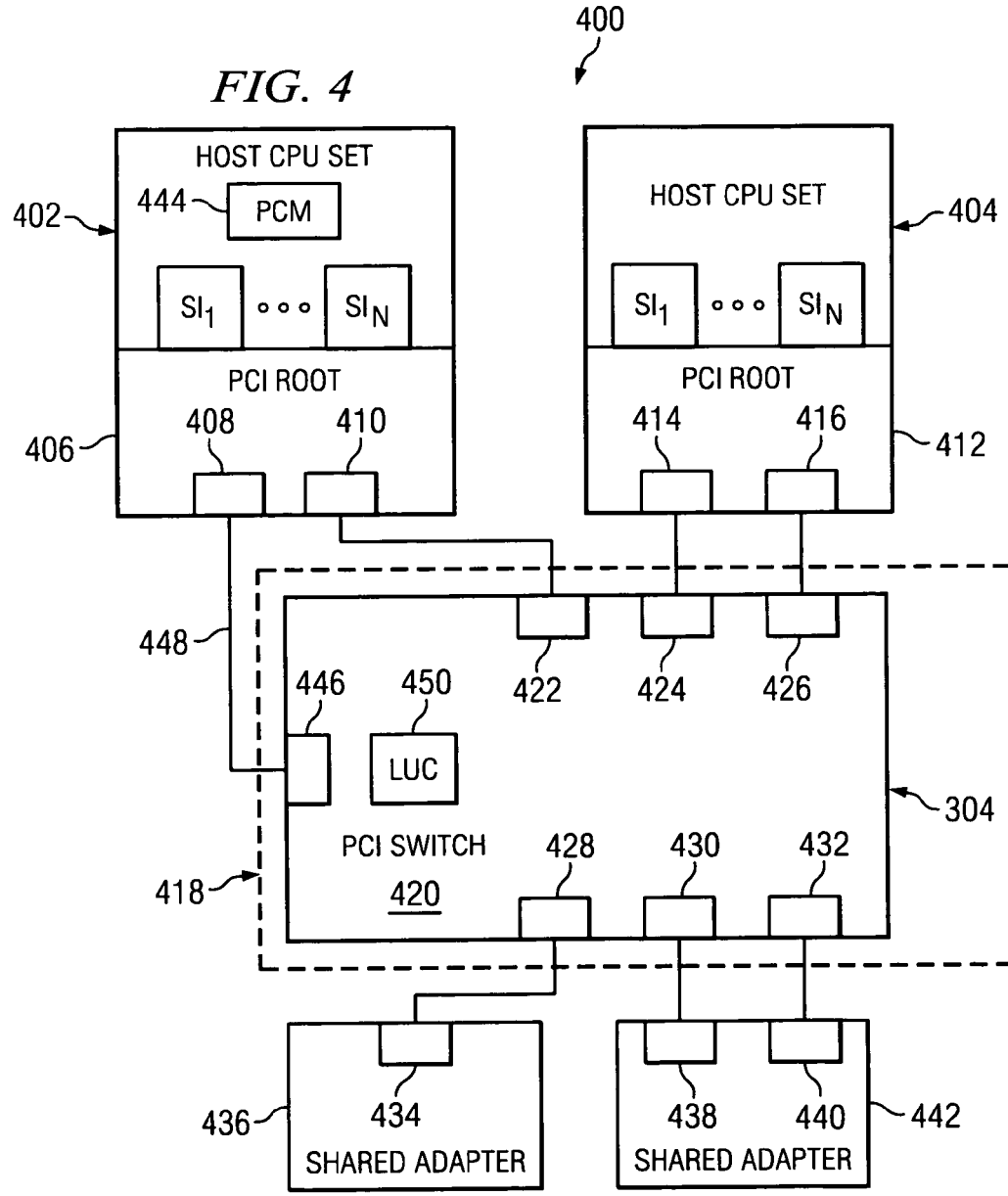
FIG. 4 is a block diagram showing a distributed computer system, wherein the system is similar to the system of FIG. 1 and depicts a PCI switch shared by different root nodes.

Referring to FIG. 4, there is shown a distributed computer system 400 that is similar to the type of system shown in FIG. 1. One of the root nodes in system 400 comprises a host CPU set 402, and another root node comprises a host CPU set 404. Host set 402 has a root complex 406 provided with ports 408 and 410, and host set 404 has a root complex 412 with ports 414 and 416. Host CPU sets 402 and 404 both contain a plurality of hosts, partitions or system images, respectively designated $SI_1$-$SI_N$.

Referring further to FIG. 4, there is shown a switched-fabric bus 418, similar or identical to fabric bus 144 of FIG. 1. Fabric 418 of FIG. 4 is additionally shown to include a PCI switch 420, which is shared by both host CPU sets 402 and 404. Thus, upstream port 422 of switch 420 is connected to port 410 of root complex 406, and upstream ports 424 and 426 are connected to ports 414 and 416, respectively. Moreover, downstream port 428 of switch 420 is connected to a port 434 of a shared adapter 436. Similarly, downstream ports 430 and 432 are connected to ports 438 and 440, respectively, of shared adapter 442. Accordingly, by judiciously configuring routes through switch 420 for PCI transaction packets, adapters 436 and 442 can be shared by different system images $SI_i$ from host sets 402 and 404.

In order to configure switch 420 to set up the desired routes between respective system images and adapters, host CPU set 402 is provided with a component 444, referred to as a PCI Configuration Master (PCM). PCM 444 generates routing configuration instructions for the PCI switch 420, and the instructions are coupled to the switch from port 408 to switch port 446 by means of a link 448.

Referring further to FIG. 4, there is shown PCI switch 420 provided with a look-up component (LUC) 450. When an error occurs in connection with an adapter 436 or 442, an error message packet, such as packet 300 described above, is routed from the adapter to switch 420. LUC 450 is operable, as described hereinafter in connection with FIG. 5, to determine which of the root nodes or host sets should receive the error message.

Referring to FIG. 5, there is shown LUC 450 connected to receive error message packets, such as packet 300, from respective switch ports 428, 430 and 432. LUC 450 is provided with routing logic 502, which includes a routing table 504. When LUC 450 receives an error message packet, the packet is directed to routing logic 502, which has access to respective switch ports 422, 424 and 426. Requestor ID 302 of the error message is then used to access error routing table 504. Information in routing table 504 is used to generate an error message 506, corresponding to the information contained in packet 300. For example, error message 506 may have a BDF index or a BDF number and an error message code number that respectively correspond to requestor ID 302 and message code 304 of packet 300. Thereafter, the error message 506 is routed to the switch port connected to the root node indicated by requestor ID 302. For example, if host CPU set 402 is the indicated root node, the error message 506 would be routed to switch port 422, as its port of egress from switch 420. The error message would then be sent to the host set 402.

Referring to FIG. 6, there is shown the look-up table 504 located in message code 304, in greater detail. When an error message packet 300 is received at table 504, the values of the requestor ID and the error message code elements contained in the error message are mapped to a $port_1$ in table 504. Thus, if the error message has a requestor ID value 602 and a message code value 618, $Port_1$ is identified as the port to use to route the error to the correct root complex. $Port_1$ could, for example, be port 422 as discussed above.

Referring to FIG. 7, there is shown a flow chart illustrating successive steps in an embodiment of the invention. After an adapter error has been detected, as shown by function block 702, an error message is generated as indicated by function block 704. The error message includes a requestor ID and an error message code, as described above. In accordance with function blocks 706 and 708, the error message is routed to a PCI switch. The requestor ID is then used, together with a look-up table at the PCI switch, to determine the root node that is in control of the adapter generating the error message. In a different embodiment, the error message would simply be broadcasted to all of the root nodes, or to all the root nodes affected by the error.

Referring further to FIG. 7, function block 710 shows the error message delivered to the controlling root node. Thereupon, the requester ID is taken from the error message packet, and used with a look-up table at the root node to determine which system image or images at the root node are affected by the adapter error, and should thus operate in response to the error. This is illustrated by function block 712.

Referring to FIG. 8, there is shown a look-up table 800 located in one of the root complexes, such as in host CPU set 402. Table 800 contains BDF Numbers 802-816 and error message code numbers 818-832. When an error message 506 is received at host set 402, the BDF number and error message code number contained in the error message are mapped to a system image $SI_1$ in table 800. Thus, if the error message 506 has a BDF number 802 and an error message code number 818, system image $SI_1$ is identified as the system image associated with the adapter that detected the error. Accordingly, the error message is routed to this system image. Generally, error messages will be routed to a system image based on BDF number. However, there may be some classes of errors that can get filtered based on the error type.

Accordingly, some functionality is needed in the bridges that connect IOAs to the I/O bus so as to be able to assign resources, such as individual IOAs or parts of IOAs to separate partitions; and, at the same time, prevent the assigned resources from affecting other partitions such as by obtaining access to resources of the other partitions.

The invention can take the form of an entirely hardware embodiment, an entirely software embodiment or an embodiment containing both hardware and software elements. In a preferred embodiment, the invention is implemented as a combination of hardware and software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. In a distributed computer system comprising multiple root nodes, each including one or more system images, and further comprising one or more PCI switches and one or more I/O adapters, a method for routing I/O adapter error messages to respective system images, said method comprising the steps of:

detecting the occurrence of an error at a specified one of said adapters, wherein said error affects one of said system images, said specified adapter is affected in its entirety by said error, and said error is detected by the PCI switch that is immediately above said specified adapter in said distributed computer system;

generating an error message that provides notice of said error, wherein said error message is generated by creating a PCI transaction packet that contains said error message, said error message packet is directly routed to all root nodes involved with said error, and said error message contains a source element identifying the source requesting said message and an error element identifying the type of error associated with said message;

routing said error message from said specified adapter to the particular root node that includes said affected system image, wherein said step of routing said error message includes directing said error message to a selected PCI switch containing a look-up table, and using said source element, together with information in said look-up table, to select a port of said selected switch for use as an egress port for said error message, wherein said egress port is disposed to route said error message to said particular node; and selectively processing said error message at said particular root node in order to identify said affected system image, wherein said affected system image is identified by selectively comparing said source element with information contained in a look-up table located at said particular node.

* * * * *